STEREO FM TRANSMISSION SYSTEM

Filed April 18, 1960 2 Sheets-Sheet 1

INVENTORS
Robert Adler
Adrian J. De Vries
Carl G. Eilers
By Francis W. Crotty
Atty.

STEREO FM TRANSMISSION SYSTEM

INVENTORS
Robert Adler
Adrian J. De Vries
Carl G. Eilers
By Francis W. Crotty
Atty.

3,257,511

STEREO FM TRANSMISSION SYSTEM

Robert Adler, Northfield, Adrian J. De Vries, Elmhurst, and Carl G. Eilers, Fairbury, Ill., assignors to Zenith Radio Corporation, a corporation of Delaware Filed Apr. 18, 1960, Ser. No. 22,926
25 Claims. (Cl. 179—15)

This invention relates to a new and improved transmission system, being particularly directed to a stereo FM transmission system which has the attractive attribute of compatibility with existing monaural equipment.

With the advent of stereo recordings and the increased use of stereo reproducing instruments in the home, it has become desirable to arrange for broadcasting stereo programs with the same high quality as such recordings. Of course, there are vast quantities of monaural FM receivers presently in use and it is certainly desirable, indeed essential, that any system of FM stereo broadcasting permit reproduction of the program signal through such existing receivers, both to avoid unnecessary obsolescence and to make available a large potential receiving audience at the inception of stereo broadcasting even before any great quantity of stereo receivers, as such, have been placed in use. Consequently, in order to be effective from a business standpoint and in order to preserve the utility of existing FM receivers, it is necessary that the FM stereo transmitter develop a signal which can be reproduced monaurally by FM receivers currently in homes. By the same token, it is equally desirable that the stereo receiver be capable of responding to a conventional monaural broadcast in order to have maximum flexibility and to accommodate situations where the program material is not available in stereo form and must, therefore, be broadcast monaurally.

One substantial difficulty presented in the construction of a compatible stereo FM system stems from the restricted frequency range of an FM channel. If stereo broadcasts are to be made available without requiring a reallocation of channels, it is necessary that the broadcast stereo information be confined to frequency limitations imposed on existing channels. On the other hand, it is highly desirable to minimize reduction of the frequency deviation assigned to that portion of the program which may be reproduced by a monaural receiver to the end that the quality of reproduction by the monaural receiver may not be materially deteriorated.

Another substantial difficulty that may be encountered in the stereo broadcast systems is attributable to cross talk between the two channels constituting the stereo transmission. It is essential that cross talk be held to a minimum to preserve the quality of the transmitted signal. Moreover, it is highly desirable that any FM stereo transmission system be readily adaptable to existing broadcast equipment to eliminate the necessity for wholesale replacement of equipment in the transition from monaural to stereo operation.

Recently, FM broadcasters have provided an auxiliary service referred to as background music in which the program signal is conveyed on a subcarrier and disseminated on the same channel as the monaural FM transmission. Any proposed stereo system which permits the continuation of this practice is highly attractive to broadcasters since it means obtaining maximum yield from the broadcasting facilities. The background music is usually a subscription service and any stereo broadcasting system which makes it difficult for this system to be appropriated by non-subscribers has additional attraction.

Accordingly, it is a principal object of the invention to provide a new and improved stereo FM transmission which is fully compatible with monaural systems and equipment.

It is a further object of the invention to provide a new and improved transmitter for an FM stereo system which develops a compatible signal and which also is effective to utilize virtually the full range available within present frequency limitations for the transmission of information reproducible by a conventional monaural receiver.

Another object of the invention is to provide a new and improved stereo FM transmission system which exhibits certain characteristics and advantages of a time-division multiplex transmission system but in which the higher harmonics of the subcarrier or switching signal are not transmitted.

A specific object of the invention is to provide a new and improved FM stereo transmission system in which the transmitted signal may be demodulated in any of a number of different ways and which is further advantageous in that the signal may be effectively demodulated by a single demodulator circuit without the need for subsequent matrixing.

Another particular object of the invention is to provide an FM stereo transmission system of great flexibility in that it may permit concurrent use of a transmission channel for such auxiliary services as background music and yet without objectionable cross talk either of the stereo signals in respect of themselves or in respect of the auxiliary service signal.

A transmitter for a stereo FM transmission system embodying the invention comprises means for developing first and second audio signals A and B. A key signal generator is provided for generating a subcarrier signal having a fundamental frequency S substantially higher than the highest audio frequency to be transmitted, preferably corresponding to at least twice the highest audio frequency. The transmitter further includes means for effectively multiplying each of the audio signals A and B with the subcarrier signal to develop a suppressed carrier amplitude modulated subcarrier signal. Also included in the transmitter are transmission means for generating a transmission signal comprising a carrier signal frequency-modulated in accordance with the following modulation function:

$$M(t)=K_1(A+B)+K_2(A-B)\cos\omega_s t+K_3S'$$

where $K_1$—$K_3$ are constants and S' is a pilot signal of a frequency related to the fundamental component of the subcarrier signal. The transmission means of the transmitter include a carrier signal generator for generating a carrier signal, frequency modulation means, and means for applying the carrier signal, the sum of the A and B signals, the pilot signal, and only the fundamental component of the amplitude-modulated subcarrier signal to the frequency modulation means.

In accordance with another aspect of the invention a receiver for the stereo FM transmissions system utilizes a transmitted signal comprising a carrier frequency-modulated in accordance with the modulation function of the general form:

$$M(t)=K_1(A+B)+K_2(A-B)\cos\omega_s t$$

where A and B are audio signals, $K_2(A-B)\cos\omega_s t$ represents the fundamental component of a suppressed-carrier amplitude-modulated subcarrier signal having an angular frequency $\omega_s$ and a phase reversal with each zero crossing of the amplitude-modulation, and $K_1-K_2$ are substantially equal constants. The receiver comprises a first signal translating channel including a discriminator, input means for applying the received signal to the discriminator to develop a signal corresponding to the modulation function, means for supplying a demodulation signal of constant phase and having a frequency equal to the fundamental component of the subcarrier, means for utilizing the demodulation signal to derive from the output signal of the discriminator a program signal representing the A audio signal, and amplifying and sound reproducing means for utilizing the A signal. The receiver also includes a second signal translating channel including the discriminator and the input means for applying the received signal to the discriminator to develop a signal corresponding to the modulation function, and further including means for supplying a demodulation signal of constant phase and having a frequency equal to the fundamental of the subcarrier, means for utilizing the demodulating signal to derive from the output signal of the discriminator a program signal representing the B audio signal, and amplifying and sound reproducing means for utilizing the B signal.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is a block diagram of an FM stereo transmitter constructed in accordance with one embodiment of the invention;

FIGURE 1A includes wave forms used in explaining the operation of the transmitter of FIGURE 1;

Figure 1:
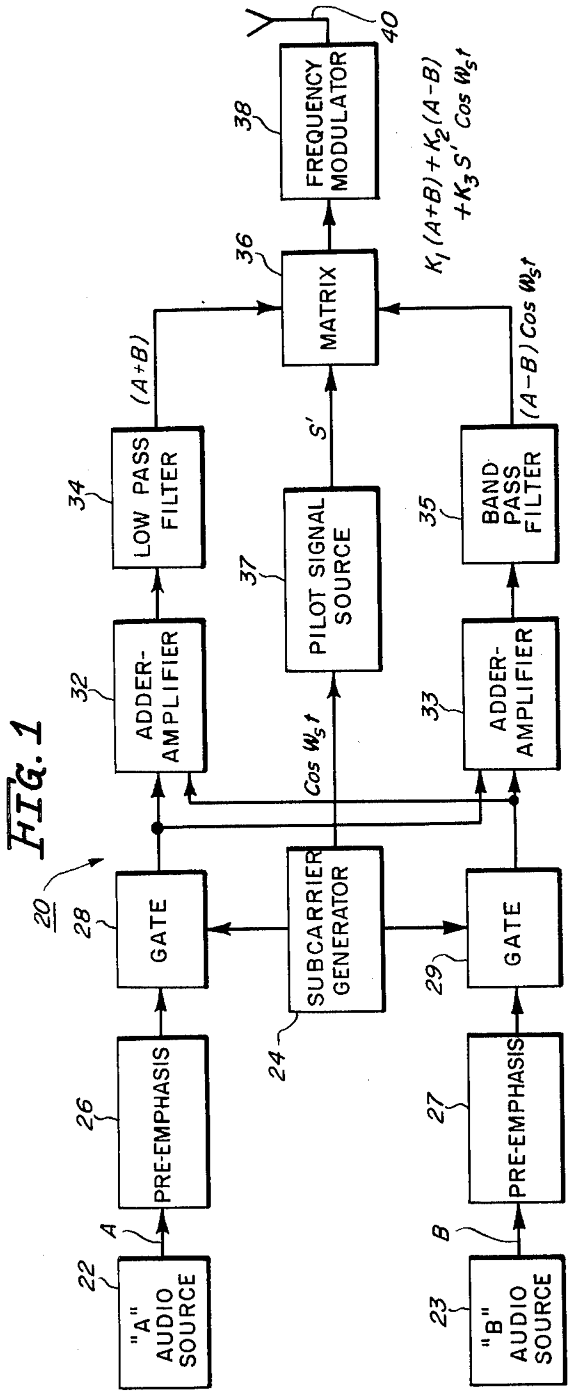
Figure 2:
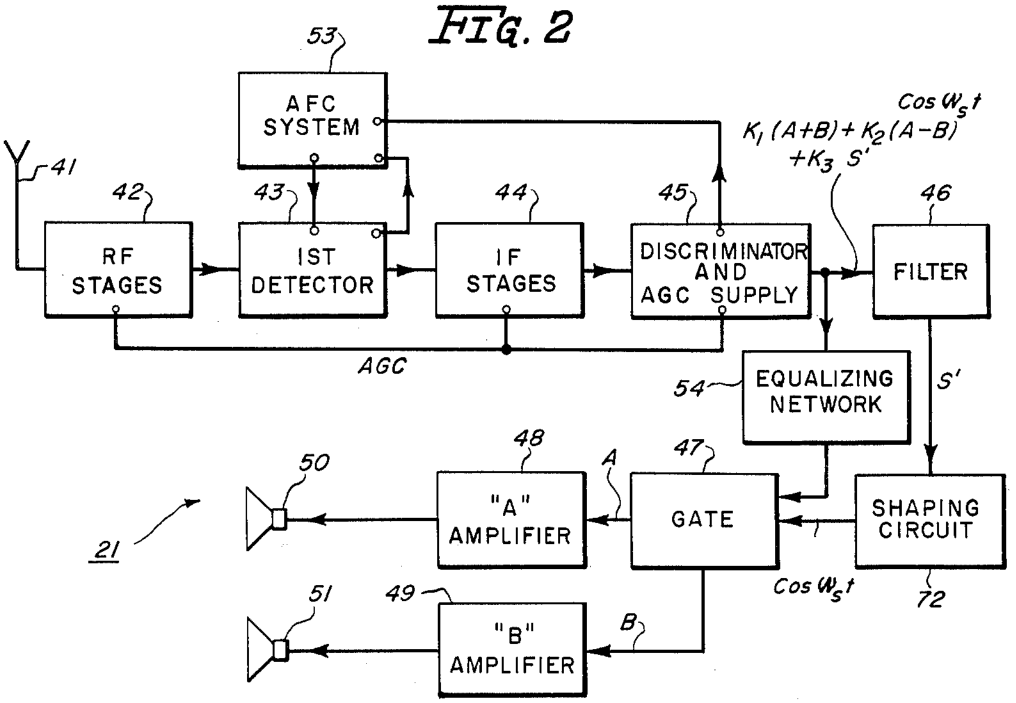
FIGURE 2 is a block representation of a stereo receiver which may utilize the transmission radiated from the arrangement of FIGURE 1.

Referring now more particularly to FIGURE 1, the FM stereo transmitter 20 there represented, taken in conjunction with receiver 21 of FIGURE 2, affords a complete FM stereo system which is compatible with current monaural FM broadcasting systems, which exhibits a completely acceptable signal-to-noise figure in respect of the stereo transmission, and which has highly desirable capabilities with respect to background music and storecasting practices.

The transmitter comprises a first audio source 22 and a second audio source 23, shown in block diagram and designated as audio sources A and B, respectively. Source 22 may comprise an individual microphone, one of two pick-up circuits of a record player capable of reproducing a stereo recording or any other similar source of audio signals. Similarly, source 23 may comprise any generator of audio signals related to source A in the usual fashion of stereophonic sound. The audio signal from source 22 may be represented by the following expression:

$$A=K_1 \cos w_A t \qquad (1)$$

while the output signal from source 23 may be represented by the expression:

$$B=K_2 \cos w_B t \qquad (2)$$

where $K_1$ and $K_2$ are constants.

Usually, FM transmitters practice pre-emphasis which is a well known technique for emphasizing the high-frequency components of the program relative to the low-frequency components thereof for certain noise advantages. In general, this is accomplished by including a pre-emphasis network in the frequency modulator of the transmitter. However, in the arrangement represented in FIGURE 1 pre-emphasis networks 26, 27 are coupled to individual audio sources 22 and 23, respectively. Where pre-emphasis is introduced in this part of the transmitter, of course, it is omitted from the frequency modulator. Pre-emphasis networks 26, 27 couple audio sources 22 and 23 to gate circuits 28 and 29. These gates, which may take the form of gated amplifiers or gated diodes, are actuated in alternation in known fashion to accomplish time-division multiplexing of the signals from the two audio sources. To that end a subcarrier generator 24 supplies a gating or switching signal to each of gates 28 and 29. The frequency of generator 24 should be high compared to the highest audio component to be transmitted in the system and usually it should be at least twice the highest audio frequency to avoid overlap of modulation sidebands. Where a partial overlap is not objectionable, the switching frequency may be slightly less than twice the highest audio. For high quality FM stereo transmission a switching frequency of 30 to 50 kc. is usually employed in accommodating an audio spectrum extending up to 15 kilocycles. Obviously, for effective time sharing by sources 22 and 23 the switching signal is applied in phase opposition from generator 24 to gates 28 and 29.

It is contemplated that the main carrier of the transmitter is to be modulated by the sum signal of sources 22 and 23 or by what is popularly referred to as the $(A+B)$ signal while a subcarrier is to be modulated by the difference signal which is usually referred to as the $(A-B)$ signal. In order to derive these sum and difference signals, an adder amplifier 32 is coupled to the output circuits of gates 28 and 29 while a second amplifier 33 is likewise coupled to the output circuits of these same gates. Amplifier 32 is succeeded by a low-pass filter 34 which is selected to have a cut-off frequency slightly above the highest audio frequency without disturbing the phase of the highest audio. The output terminal of filter 34 is connected to one input of matrix 36.

Amplifier 33 is similarly connected to a filter 35 which is a band-pass filter constructed to pass only the modulation components adjacent the fundamental subcarrier frequency as explained more particularly hereinafter. The output of filter 35 is applied to another input of matrix 36.

In addition to the sum and difference signals, a signal component representing the fundamental frequency of generator 24 is also supplied to matrix 36 by means of a pilot-signal source 37 interposed between generator 24 and the matrix. The pilot signal may correspond in frequency to the fundamental, to a harmonic or to a sub-harmonic of the signal from generator 24. There is a distinct advantage of avoiding phase ambiguity by utilizing the fundamental or sub-harmonic relation so source 37 will be considered to be a filter that selects the fundamental component of generator 24 for application to matrix 36 to be transmitted to receiver installations in order that synchronous demodulation may be accomplished. As is well understood, the sending and receiving ends of a time-multiplex system must be maintained in synchronism and that is the role satisfied by the pilot signal component of generator 24.

The output terminal of matrix 36 is coupled to a frequency modulator 38 which will be assumed to include a suitable carrier-signal source. Modulator 38 may be of conventional construction and may be of the same type currently used in the modulation stages of monaural FM transmitters. Accordingly, it will be apparent that the described arrangement lends itself to incorporation with conventional FM transmitter modulation equipment now in use without any substantial modification. Modulator 38 may include one or two more stages of amplification and may also comprise a frequency multiplier. The modulator is connected to the transmission antenna 40 from which the signal is radiated.

Figure 1A:
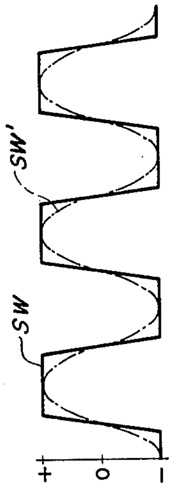

In operation, the two audio signals from sources 22 and 23 after pre-emphasis in networks 26 and 27 are delivered to gates 28 and 29. These gates, being operated in alternation under the influence of the switching signal supplied by generator 24, effect time-division multiplexing of the A and B signals. The time sharing is represented in the curves of FIGURE 1A.

Full line curve SW represents one form that the switching signal may take; as here depicted it is a type of square wave having a fundamental component represented by the dot-dash curve SW′. The excursions of the switching signal about its alternating-current axis operate gates 28 and 29 in alternation and on a 50/50 duty cycle. The effect of the switching signal is a time sharing or time-division multiplexing of audio signals A and B.

Figure 3A:
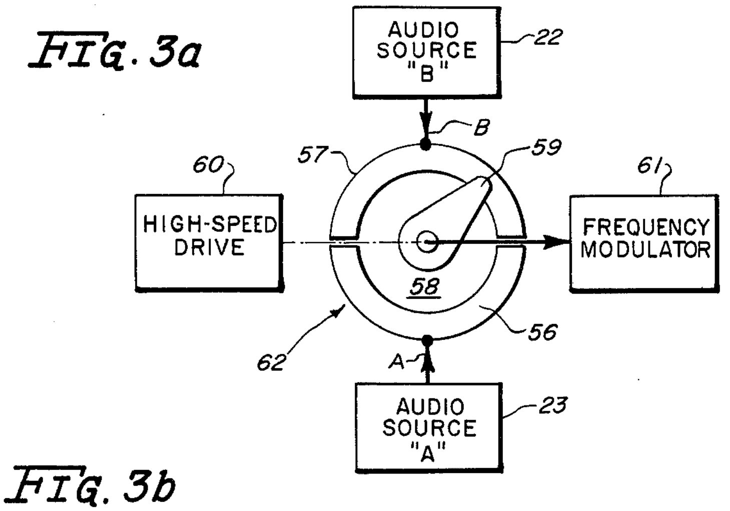
FIGURE 3A is a simplified diagram utilized in explaining the operation of a time-division multiplex system.

The time-multiplexing function accomplished in the transmitter of FIGURE 1 is similar to that of the simplified device illustrated in FIGURE 3A wherein audio sources 22 and 23 are connected to two electrodes 56 and 57 of a rotary switch 58 having an output electrode or rotary contact 59. Rotary contact 59 is driven by a suitable drive mechanism 60 at a rate corresponding to the operating frequency of generator 24 of FIGURE 1 and this contact is connected to an FM modulator-oscillator 61. This mechanism is a simplified representation of a direct time-division multiplexing system as applied to stereo FM transmission.

Figure 3B:
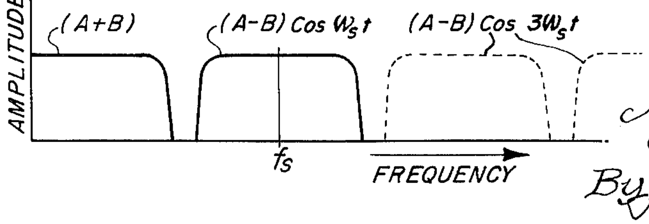
FIGURE 3B is a frequency distribution diagram utilized in discussing the operation of the transmission system.

The frequency distribution of the output signal from the apparatus of FIGURE 3A, assuming the gaps separating electrodes 56 and 57 to be very small, is illustrated in FIGURE 3B. The components included in the low-frequency distribution of the frequency diagram represent the sum of the A and B signals and the components in the high-frequency portion of the diagram represent the difference of the A and B signals multiplied by the subcarrier or key signal cos $\omega_s t$ and odd harmonics thereof. The frequency distribution is such that all of the necessary audio signal information can be transmitted using the low-frequency portion and only that part of the high-frequency portion which represents the fundamental modulation products of subcarrier signal cos $\omega_s t$. No additional necessary audio information is contained in the higher odd harmonics of the subcarrier. Accordingly, the high-frequency portion of the transmission may be limited to the fundamental modulation products without loss of any essential information.

In short, the information contained in the low-frequency portion of the diagram designated $A+B$ plus only that portion of the high-frequency portion of the diagram designated $(A-B)$ cos $\omega_s t$ conveys the entire intelligence and represents all of the frequency components that are transmitted. Of course, as explained above it is also desirable to transmit a pilot signal which is represented in the diagram of FIGURE 3B by the ordinate $f_s$. The broken-line extension of the high-frequency portion of the diagram designated $(A-B)$ cos $3\omega_s t$ . . . . depicts the higher order modulation products which are not transmitted.

The described time-division multiplex switching system is basically a sum and difference system. The sum of the A and B stereophonic channels appears as audio modulation on the main radiated carrier, being selected by low-pass filter 34, whereas the difference between the A and B stereophonic channels appears as suppressed carrier, amplitude-modulation of a series of odd harmonics of the switching or subcarrier rate corresponding to the fundamental frequency of generator 24. The condition of odd harmonics only is established: (a) for the apparatus of FIGURE 3A if the gaps between electrodes 56, 57 are very small, and (b) for the switching arrangement of FIGURE 1 if the switching signal has approximately a 50/50 duty cycle. If the gates are open for appreciably less than 50 percent of the cycle, even harmonic terms including the $(A+B)$ signal are also present. The system may be operated in this fashion but more filtering is required to remove such added harmonic terms. Where odd-harmonic terms only are present, the modulation function may be expressed mathematically as follows:

$$\frac{(A+B)}{2}+\frac{2(A-B)}{\pi}\cos\omega_s t-\frac{2(A-B)\cos 3\omega_s t}{3\pi}+\frac{2(A-B)}{5\pi}\cos 5\omega_s t-\ \cdot\ \cdot\ \cdot\ =M(t) \qquad (3)$$

where: $M(t)$ is the composite modulation; $\omega_s$ is the subcarrier angular frequency.

Since the fundamental subcarrier term contains all the necessary stereophonic information in the form of $(A-B)$ modulation, and in order to prevent radiation outside the frequency restrictions of the transmission channel and further to allow for the possible addition of auxiliary services such as background music, the spectrum of the modulation is restricted to the necessary stereophonic components. This is accomplished by band-pass filter 35 which has a frequency characteristic shaped to make this selection. The new composite modulation may then be described by the following function:

$$(A+B)+(A-B)\cos\omega_s t=M'(t) \qquad (4)$$

where: $M'(t)$ is the new modulating function. Adding the pilot signal component, the composite modulation signal is as follows:

$$(A+B)+(A-B)\cos\omega_s t+K_3S'=M(t) \qquad (4')$$

where $K_3$ is a constant and $S'$ is a pilot signal of a frequency related to the fundamental component of the modulated subcarrier signal.

Comparison of Equations (3) and (4) shows the amplitude ratio of the main and sub-channels to have been modified. Of course, choice of the gain characteristics of amplifiers 32 and 33 permits this amplitude change to be accomplished. In the more general sense, the composite modulation function, allowing for changes in the amplitude ratio between the main and subcarrier channels may be expressed as follows:

$$K_1(A+B)+K_2(A-B)\cos\omega_s t+K_3S'=M(t) \qquad (4'')$$

where $K_1$ and $K_2$ are constants and the other terms are defined as indicated above.

It will be noted that the maximum peak-to-peak amplitudes of the sum audio and difference modulated subcarrier are equal. It is also true, but not obvious, that the composite modulation function maximum peak-to-peak amplitude is equal to the maximum of either of the components alone. Therefore, the transmitter may be fully modulated with the $(A+B)$ audio and then fully modulated with the $(A-B)$ subcarrier without having to reduce the modulation percentage of either component as applied to the radiated carrier. This interleaving property of the sum and difference signals is directly related to the concept of time-division multiplexing between the A and B stereophonic signals.

The presence of the pilot-signal component at all times, whether the modulation is present or not, requires that the modulation percentage for the composite modulating function be reduced in order to accommodate the pilot signal. An acceptable schedule of modulation is as follows:

| | Percent |
|---|---|
| Main channel modulation $(A+B)$ | 90 |
| Sub-channel modulation $(A-B)$ suppressed carrier | 90 |
| Pilot signal modulation | 10 |

Both the $(A+B)$ and $(A-B)$ channels are full 15 kc. channels matched in amplitude and phase.

Matrix 36 which may be a relatively simple resistance network employed as an adding matrix delivers the signal defined in Equation (4′) to frequency modulator 38 wherein the carrier signal is frequency modulated in a conventional manner. The resultant frequency modulated signal is radiated by antenna 40.

A receiver to uttilize the stereo broadcast is, at least up to the discriminator-detector stage, generally the same as a conventional FM receiver although for optimum performance it is desirable that it have better properties than the usual monaural receiver. In particular, it is preferred that the receiver have high sensitivity so that the stereophonic signal-to-noise ratio is acceptable in fringe areas and its AM rejection properties and bandwidth characteristics should be better than that usually encountered in the present-day commercial monaural receiver.

A representative receiver is illustrated in FIGURE 2 where a radio-frequency amplifier 42 of any suitable number of stages is coupled to a receiving antenna 41. Connected in cascade to the output of amplifier 42 are a first detector or oscillator-modulator 43, an intermediate-frequency amplifier 44 of any desired number of stages and a discriminator and AGC supply 45. An AGC bus applies AGC potential to both the RF and IF stages and in addition to gain control the receiver, by preference, has frequency control of the local oscillator included in first detector 43. An AFC system 53 has input terminals connected to both the oscillator of detector 43 and to discriminator 45 and it is arranged in a conventional manner to derive a control potential in response to the frequency relation of the local oscillator and the carrier component of the received broadcast signal to adjust the operating frequency of the heterodyning oscillator and maintain their frequency in a prescribed relation.

The intermediate-frequency bandwidth of a typical commercially available monaural FM receiver is approximately 150 to 180 kc. wide at the −6 decibel point and oftentimes the IF amplifier is synchronously tuned. The presence of the subcarrier representing the $(A-B)$ signal and the possibility of a second subcarrier for an auxiliary service such as background music presents the distinct possibility that certain side-band components of the IF signal may be positioned on a slope of the selectivity curve if it is of customary bandwith. If this is encountered it, of course, introduces amplitude modulation in the IF signal and the severity of that modulation, which only contributes to degrade the service, depends on the RF signal level and the receiver tuning. The undesired AM modulation may further be aggravated because of the modulation of these subcarriers whether that modulation be FM or AM. The limiter usually included in an FM receiver is relied upon to remove all such unwanted AM modulation components but if the limiter is not saturated, which certainly would be the experience at least in fringe areas, the unwanted amplitude modulation passes through the discriminator to appear as undesired cross talk in the audio output.

To safeguard against the possibility of such cross talk the bandwidth of the IF stages of the receiver of FIGURE 2 is widened to approximately 230 kc. and an effective AGC system maintains the level of the signal translated by the RF and IF amplifiers 42 and 44 substantially constant in spite of variations in the intensity of the received signal. Further to protect against unwanted AM the receiver may employ more than one limiter although a practicable solution is to include in the arrangement of discriminator 45 both the usual limiter and a ratio detector which has limiting attributes and preferably its bandwith should be of the order of 300 kc.

The output of discriminator 45 is connected to a filter 46 which is selective to the fundamental frequency of the subcarrier or the pilot signal representing the subcarrier frequency. Filter 46 is connected through a shaping circuit 72 to one input of an electronic gate 47; the function of shaping circuit 72 will be considered more particularly presently. Another input of gate 47 is connected through an equalizing network 54 to the output terminals of discriminator 45. Gate 47 has two output terminals, one being connected through an amplifier 48 to a sound signal transducer or loud speaker 50 and the other being connected through a similar channel comprising an amplifier 49 and loud speaker 51. The first channel including amplifier 48 will be referred to as the A channel and the other will be referred to as the B channel and the assignment of each will be to reproduce an audio signal corresponding to that developed by audio sources 22 and 23, respectively, of transmitter 20 of FIGURE 1.

Thinking of the system as partaking of a time-division multiplex, as described in conjunction with the consideration of the transmitter, it will be appreciated that gate 47 functions as a sampling device which subjects the A and B channels in alternation to the output signal of the gate derived in response to the input signals from discriminator 45 and shaping circuit 72. Indeed, the detected output of discriminator 45 may be represented by Equation (4) which defines the composite signal. The sum or $(A+B)$ signal is contained in the low-frequency band and the difference or $(A-B)$ signal is contained in the fundamental subcarrier term and those skilled in the art will recognize that these two signals available in the output of the discriminator may be operated upon in a variety of ways to derive the desired A and B signals for application through the A and B channels to loud speakers 50 and 51. For example, the components could be separated by filters and operated upon individually; or they may be operated upon conjointly in a synchronous detector. A synchronous detector arrangement having particular merit is the subject of an application filed concurrently herewith in the name of Adrian De Vries, Serial No. 22,830, entitled "Stereo FM Transmission System" and assigned to the same assignee as the present invention.

For the purpose of continuing a specific description of an illustrative embodiment of the invention, it will be assumed that gate 47 is actuated by a switching signal delivered from shaping circuit 72 to detect the A and B signals.

Of course, amplifiers 48 and 49 individually include the usual de-emphasis network to restore the proper weight to the various frequency components of the audio information, compensating for the pre-emphasis introduced at the transmitter.

In considering the operation of receiver 21 of FIGURE 2, it will be understood that the composite FM stereo program modulated on the broadcast carrier signal is in accordance with Equation (4). It is intercepted by antenna 41 and translated through discriminator 45 in conventional fashion. The pilot signal component of the detected composite signal, after selection in filter 46 and shaping in shaping circuit 72, is effectively used as a multiplier to multiply the low-frequency term or the $(A+B)$ signal and the fundamental subcarrier term or the $(A-B)$ signal to recover the A and B program signals. The operation in this regard may be more clearly understood by further consideration of the composite modulation or stereo signal.

Consider the effect of multiplying the composite signal of Equation (4′) with a multiplier satisfying the following expression:

$$1 \pm K \cos \omega_s t \qquad (5)$$

Using the plus sign of the multiplier and assigning to constant K the value of 2 yields as the significant term of the multiplication 2A and using the negative sign in expression (5) with the same assumption yields as the significant term of the multiplication 2B. It must be recognized that this is premised on ideal or perfect conditions in which the composite signal available at the output of the discriminator has unity or equal co-efficients for the sum or $(A+B)$ and the difference or $(A-B)$ components of the composite signal of Equation (4′). This analysis shows the possibility of operating upon that signal to derive the desired program signals for actuating loud speakers 50 and 51.

As a practical matter it is not convenient to arrive at a wave form of a multiplying signal which satisfies expression (5) and therefore consideration is given to the functions which define the wave forms of alternative signals that are readily available for use as multipliers. For example, a multiplying signal of square wave form is defined by the following function:

$$\frac{1}{2}+\frac{2}{\pi}\cos\omega_s t-\frac{2}{3\pi}\cos 3\omega_s t \qquad (6)$$

However, only the first two terms of expression (6) are of importance. Obviously, since the function defining this multiplier is specifically different from that of expression (5) initially considered in respect of ideal conditions of transmission, it is necessary to introduce a correlated modification to the co-efficients of the sum or $(A+B)$ term and the difference or $(A-B)$ term of Equation (4′) in order to achieve the desired results through the multiplication. In particular, the ratio of the co-efficients of the $(A+B)$ and $(A-B)$ terms is to be $2/\pi$. Adjustment of the coefficients of these terms is accomplished by equalizing network 54 through which the signals are delivered from discriminator 45 to gate 47. At the same time the characteristics of shaping circuit 72 become manifest. This may be a clipper operating on the sinusoidal signal component delivered by filter 46 to shape it in known manner to conform to a square wave multiplier satisfying expression (6).

The operation of gate 47 in response to a switching signal of this definition supplied by shaping circuit 72 causes amplifier 48 and speaker 50 to receive the A program signal and amplifier 49 and speaker 51 to receive the B signal. Accordingly, the conjoint effect is stereophonic reproduction.

One specific example of the concept of signal reproduction has been given above but in its more general sense it comprehends that the composite program signal is to be operated upon by a multiplier having such relation to the composite signal as to yield the A and B program signals. The perfect transmission represented by Equation (4′) need not always be experienced; in fact, the sum and difference terms may have unequal coefficients even in the transmitter. Or, the coefficients may be modified in part in the transmitter and in part in the receiver but appropriate correlation of the function representing the multiplying signal and the composite signal which it operates upon yields the desired A and B program signals.

In practicing the invention with diode gates for units 28 and 29, it has been found convenient to arrange generator 24 at transmitter 20 to produce as subcarrier S a signal of the wave form shown in full-line curve in FIGURE 1A. It is essentially a square wave 20 volts peak to peak with a high frequency response limited to about 200 kc. This has the convenience that shaping circuit 72 may readily derive the multiplier of correct wave form at the receiver. In fact, it may be a signal of generally similar wave form to that of the subcarrier supplied by generator 24.

Obviously, the A and B signals derived in gate or modulator 47 must be properly directed to the A and B channels, respectively, to achieve correct stereophonic reproduction. This may be accomplished through the setting of standards. For example, where the frequency of the pilot signal is the same as the fundamental of the $(A-B)$ subcarrier, the signal available at discriminator 45 in the presence of A program modulation alone has a distinct and identifiable wave form. Likewise, the signal available in the presence of B program modulation alone is distinct and readily distinguishable on the basis of its wave form from the condition of A signal modulation alone. The specific wave forms for the two conditions vary with polarity of the pilot signal so if the polarity is specified, one can recognize and identify the two signal conditions as required to correlate the A and B signals with the A and B channels.

Use of a pilot signal at half the fundamental of the $(A-B)$ subcarrier eases its separation from the other components of the composite modulation of the stereo transmission. Moreover, since the second harmonic of the pilot, which is used in deriving the A and B signals, is independent of the polarity of the pilot there is no need to specify polarity in preparing standards. Correlation of the A and B signals with the A and B channels may be attained as described above by recognition of wave forms of the signal available at the discriminator if the phase of the pilot is specified and followed. A convenient specification of phase relation is as follows: The second harmonic of the pilot subcarrier shall be in phase with the modulated subcarrier when the A signal only is used and is instantaneously deviating the main carrier downward in frequency. The second harmonic of the pilot subcarrier is defined as one having one out of every two zero crossings coincident with the zero crossings of the pilot subcarrier.

In brief, there has been described an FM stereo system in which the sum or $(A+B)$ signal and the difference or $(A-B)$ signal may have the same peak-to-peak amplitudes and each may fully modulate the FM transmitter except for some small percentage of modulation left to accommodate the pilot signal. The radiated carrier deviation is plus or minus 75 kc. In one operating embodiment of the system the difference carrier which is in fact a suppressed carrier amplitude modulation is at 39 kc. and the system may accommodate an additional subcarrier for background music at 67 kc. It has been found that the cross talk into the main channel in the presence of the 67 kc. background music channel is within acceptable tolerance. The background channel is not detrimental to the quality of signal reproduction of a stereophonic receiver. In fact, the cross talk into the main channel is found to be less variable with tuning of the stereophonic receiver than for a monaural receiver of conventional design receiving the same transmission.

The effect of cross talk from the main channel into the stereophonic subcarrier channel and vice versa is to reduce the separation between the final A and B signal outputs. This separation is also affected by lack of tracking or changes in relative amplitude and/or phase of the $A+B$ audio and the recovered $A-B$ audio as the receiver is tuned. Tests on the described receiver reveal acceptable and attractive separation figures when the receiver is correctly tuned and even under conditions of mistuning. The separation is maintained in the stereophonic receiver probably because of the tracking of the recovered sum and difference signals at the receiver detector.

Viewed from the output of discriminator 45 to loud speakers 50 and 51, the described receiver is an AM device and, therefore, it cannot be used to pirate storecasting where that is a frequency modulated subcarrier component of the composite radiation.

A monaural receiver upon receiving the composite signal defined by Equation (4′) responds to the first term and reproduces all of the program material monaurally. Conversely, the stereo receiver 21 when used in conjunction with the monaural broadcast, reproduces the received program equally at the two output channels comprising speakers 50 and 51. In other words, its flexibility accommodates present day monaural broadcasts.

The described FM transmission system is relatively simple in its demands upon both the transmitter and receiver equipment. As compared with a system in which stereo information is transmitted in dual frequency modulated form, the system of the invention affords substantial advantages with respect to ease of reproduction of the audio signals and also in the important consideration of accommodating auxiliary services such as background music. Furthermore, the stereo information conveyed by the subcarrier signal does not have to be filtered out by a band-pass filter as required by some proposed FM stereo systems. In this regard, it may be noted that in systems in which the stereo information is frequency-modulated with a separate carrier, the signal levels of the two audio channels in the transmitter must be carefully monitored to avoid overmodulation of the subcarrier which would result in serious distortion. This operating difficulty is not encountered in the system of the present invention.

While particular embodiments of the invention have been shown and described it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A transmitter for a stereo FM transmission system comprising: means for deevloping first and second audio signals A and B; a key signal generator for generating a subcarrier signal S having a fundamental frequency S substantially higher than the highest audio frequency to be transmitted; means for effectively multiplying said audio signals with said subcarrier signal to develop a suppressed-carrier amplitude-modulated subcarrier signal; and transmission means for generating a transmission signal comprising a carrier signal frequency-modulated in accordance with the modulation function $$M(t)=K_1(A+B)+K_2(A-B)\cos \omega_s t+K_3S'$$

where $K_1$—$K_3$ are constants and S' is a pilot signal of a frequency related to the fundamental component of said subcarrier signal, said transmission means including a carrier signal generator for generating a carrier signal, frequency modulation means, and means for applying said carrier signal, the sum of said A and B signals, said pilot signal, and both sidebands of only the fundamental component of said amplitude-modulated subcarrier signal to said frequency modulation means.

2. A transmitter for a stereo FM transmission system comprising: means for developing first and second audio signals A and B; a key signal generator for generating a subcarrier signal S having a fundamental frequency S substantially higher than the highest audio frequency to be transmitted; means for effectively multiplying said audio signals with said subcarrier signal to develop a suppressed-carrier amplitude-modulated subcarrier signal; and transmission means for generating a transmission signal comprising a carrier signal frequency-modulated in accordance with the modulation function $$M(t)=(A+B)+(A-B)\cos \omega_s t+KS'$$

where K is a constant and S' is a pilot signal of a frequency related to the fundamental component of said subcarrier signal, said transmission means including a carrier signal generator for generating a carrier signal, frequency modulation means, and means for applying said carrier signal, the sum of said A and B signals, pilot signal, and both sidebands of only the fundamental component of said amplitude-modulated subcarrier signal to said frequency modulation means.

3. A transmitter for a stereo FM transmission system comprising: first and second audio signal sources for developing first and second audio signals A and B; a subcarrier signal generator for generating a subcarrier signal having a fundamental frequency S of at least twice the highest audio frequency to be transmitted, the wave form of said subcarrier being essentially that of a square wave with moderate slopes; means for effectively multiplying said audio signals with said subcarrier to develop a suppressed-carrier amplitude-modulated subcarrier signal; and transmission means for generating a transmission signal comprising a carrier signal frequency-modulated in accordance with the modulation function $$M(t)=K_1(A+B)+K_2(A-B)\cos \omega_s t+K_3S'$$

where $K_1$—$K_3$ are constants and S' is a pilot signal of a frequency related to the fundamental component of said subcarrier signal, said transmission means including a carrier signal generator for generating a carrier signal, frequency modulation means, and means for applying said carrier signal, the sum of said A and B signals, said pilot signal, and both sidebands of only the fundamental component of said amplitude-modulated subcarrier signal to said frequency modulation means.

4. A transmitter for a stereo FM transmission system comprising: means for developing first and second audio signals A and B; a signal generator for generating a switching signal having a fundamental frequency substantially higher than the highest audio frequency to be transmitted, said signal generator including means for developing a subcarrier signal S of substantially sine-wave form at the fundamental frequency of said switching signal; means for independently multiplying said switching signal, with said audio signals, in phase opposition, to develop a suppressed-carrier amplitude-modulated signal; and transmission means for generating a transmission signal comprising a carrier signal frequency-modulated in accordance with the modulation function $$M(t)=K_1(A+B)+K_2(A-B)\cos \omega_s t+K_3S$$

where $K_1$—$K_3$ are constants, said transmission means including a carrier signal generator for generating a carrier signal, frequency modulation means, and means for applying said carrier signal, the sum of said A and B signals, said subcarrier signal, and both sidebands of only the fundamental component of said amplitude-modulated signal to said frequency modulation means.

5. A transmitter for a stereo FM transmission system comprising: means for developing first and second audio signals A and B; a signal generator for generating a switching signal having a fundamental frequency S of at least twice the highest audio frequency to be transmitted; means for independently effectively multiplying said audio signals with said switching signal to develop a pair of suppressed-carrier amplitude-modulated signals; filter means, coupled to said signal generator and to said multiplying means, for effectively attenuating harmonics of said switching signal; and transmission means for generating a transmission signal comprising a carrier signal frequency-modulated in accordance with the modulation function $$F=K_1(A+B)+K_2(A-B)\cos \omega_s t+K_3S'$$

where $K_1$—$K_3$ are constants and S' is a pilot signal of a frequency related to the fundamental component of said switching signal, said transmission means including a carrier signal generator for generating a carrier signal, frequency modulation means, means for applying said carrier signal to said frequency modulation means, and means coupling said filter means to said frequency-modulation means to apply said pilot signal, the sum of said A and B signals, and both sidebands of only the fundamental components of said amplitude-modulated signals to said frequency modulation means.

6. A transmitter for a stereo FM transmission system comprising: means for developing a pair of audio signals A and B to be transmitted; a pair of gate devices each having an input circuit individually coupled to one of said first and second signal sources respectively, and an output circuit, said gate devices each including means for alternately effectively coupling said input circuit to said output circuit in response to an applied signal; means, comprising a subcarrier signal generator coupled to said gate devices, for applying a switching signal to said gate devices to actuate said gate devices at a frequency S at least twice the highest audio frequency to be transmitted; a first adder, coupled to each of said output circuits of said gates, for combining the output signals from said gates to develop an output signal of the form $(A+B)$; a second adder, coupled to each of said output circuits of said gates, for combining the output signals from said gates to develop a double-sideband suppressed-carrier amplitude-modulated output signal of the form $$(A-B)\cos\omega_s t$$

frequency modulation means, including a carrier signal generator, for modulating the frequency of a carrier signal in response to an applied signal of variable amplitude and means for applying said output signal of said first adder and both sidebands of only the fundamental component of said output signal of said second adder to said frequency modulation means.

7. A transmitter for a stereo FM transmission system comprising: means for developing a pair of audio signals A and B to be transmitted; a pair of gate devices each having an input circuit individually coupled to one of said first and second signal sources respectively, and an output circuit, said gate devices each including means for alternately effectively coupling said input circuit to said output circuit in response to an applied signal; means, comprising a subcarrier signal generator coupled to said gate devices, for applying a switching signal to said gate devices to actuate said gate devices at a fundamental frequency S which is at least twice the highest audio frequency to be transmitted; a first adder, coupled to each of said output circuits of said gates, for combining the output signals from said gates to develop an output signal of the form $(A+B)$; a low pass filter, coupled to said first adder, for attenuating subcarrier-frequency and higher frequency signals in the output from said adder; a second adder, coupled to each of said output circuits of said gates, for combining the output signals from said gates to develop a double-sideband suppressed-carrier amplitude-modulated output signal of the form $(A-B)\cos\omega_s t$; a band pass filter, coupled to said second adder, for limiting the effective output thereof to both sidebands of the modulation components of the fundamental frequency of said subcarrier signal; matrix means, coupled to said low pass filter, said band pass filter, and said subcarrier generator, for developing a modulation signal of the form $$M(t)=(A+B)+(A-B)\cos\omega_s t+KS'$$

where K is a constant and S′ is a pilot signal of a frequency related to the fundamental component of said subcarrier signal; and frequency modulation means, including a carrier signal generator, for modulating the frequency of a carrier signal in response to an applied signal of variable amplitude, said frequency modulation means further including an input circuit coupled to said matrix means.

8. A transmitter for a stereo FM transmission system comprising: means for developing a pair of audio signals A and B to be transmitted; a pair of gate devices each having an input circuit individually coupled to one of said first and second signal sources respectively, and an output circuit, said gate devices each including means for alternately effectively coupling said input circuit to said output circuit in response to an applied signal; means, comprising a subcarrier signal generator, for generating a switching signal of generally square wave form but with substantial slopes and having a fundamental frequency S at least twice the highest audio frequency to be transmitted; means for applying said subcarrier signal to said gate devices to actuate said gate devices at said subcarrier frequency, effectively coupling each of said gate device input circuits to said output circuit during less than 180° of each cycle of said subcarrier signal; a first adder, coupled to each of said output circuits of said gates, for combining the output signals from said gates to develop an output signal of the form $(A+B)$; a second adder, coupled to each of said output circuits of said gates, for combining the output signals from said gates to develop a double-sideband suppressed-carrier amplitude-modulated output signal of the form $(A-B)\cos\omega_s t$; signal combining means, including filter circuits coupled to each of said adders, for combining said output signal of said first adder, both sidebands of only the fundamental component of said output signal of said second adder, and said subcarrier signal to develop a modulation signal of the form $$M(t)=(A+B)+(A-B)\cos\omega_s t+KS'$$

where K is a constant and S′ is a pilot signal having a frequency sub-harmonically related to the fundamental of said subcarrier signal; frequency modulation means, including a carrier signal generator, for modulating the frequency of a carrier signal in response to an applied signal of variable amplitude; and means for applying said modulation signal to said frequency modulation means.

9. A receiver for a stereo FM transmission system for utilizing a transmitted signal comprising a carrier frequency-modulated in accordance with a modulation function of the general form $$M(t)=K_1(A+B)+K_2(A-B)\cos\omega_s t+K_3S'$$

where A and B are audio signals, $K_2(A-B)\cos\omega_s t$ represents both sidebands of the fundamental component of a suppressed carrier amplitude modulated sub-carrier signal having an angular frequency $\omega_s$ and a phase reversal with each zero crossing of the amplitude modulation, S′ is a pilot signal of a frequency related to said fundamental component of said subcarrier signal, and $K_1-K_3$ are constants, and $K_1$ is substantially equal to $K_2$, comprising: a discriminator; input means for applying a received signal to said discriminator to develop a signal corresponding to said modulation function; means, comprising a filter coupled to said discriminator, for generating a switching signal of constant phase and having a fundamental frequency equal to the frequency of said subcarrier; a switching device, having an input circuit coupled to said discriminator and having two output circuits, for applying a signal from said input circuit to said output circuits in alternation in response to an applied signal; and means for applying said switching signal to said switching device to control the switching operation therein and develop a pair of audio signals, corresponding to said audio signals A and B, in said output circuits.

10. A receiver for a stereo FM transmission system for utilizing a transmitted signal comprising a carrier frequency-modulated in accordance with a modulation function of the general form $$M(t)=K_1(A+B)+K_2(A-B)\cos\omega_s t+K_3S''$$

where A and B are audio signals, $K_2(A-B)\cos\omega_s t$ represents both sidebands of the fundamental frequency component of a suppressed carrier amplitude modulated subcarrier signal having an angular frequency $\omega_s$ and a phase reversal with each zero crossing of the amplitude modulation, S′ is a pilot signal of a frequency related to said fundamental component of said subcarrier signal, $K_1-K_3$ are constants, and $K_1$ is substantially equal to $K_2$, comprising: a discriminator; input means for applying a received signal to said discriminator to develop a signal corresponding to said modulation function; means, comprising a filter coupled to said discriminator, for generating a switching signal of constant phase and having a fundamental frequency equal to the frequency of said subcarrier; a switching device, having an input circuit coupled to said discriminator and two output circuits, for applying a signal from said input circuit to said output circuits in alternation in response to an applied signal; and means for shaping and applying said switching signal to said switching device to control the switching operation therein and develop a pair of audio signals, corresponding to said audio signals A and B, in said output circuits.

11. A receiver for a stereo FM transmission system for utilizing a transmitted signal comprising a carrier frequency-modulated in accordance with a modulation function of the general form $$M(t)=(A+B)+(A-B)\cos\omega_s t+KS'$$

where A and B are audio signals, $(A-B)\cos\omega_s t$ represents both sidebands of the fundamental component of a suppressed carrier amplitude modulated subcarrier signal having an angular frequency $\omega_s$ and a phase reversal with each zero crossing of the amplitude modulation, S′ is a pilot signal having a frequency sub-harmonically related to the fundamental component of said subcarrier signal, and K is a constant, comprising: a discriminator; input means for applying a received signal to said discriminator to develop a signal corresponding to said modulation function; means, comprising a filter coupled to said discriminator, for generating a switching signal of constant phase and having a fundamental frequency equal to the frequency of said subcarrier; a switching device, having an input circuit coupled to said discriminator and two output circuits, for applying a signal from said input circuit to said output circuits in alternation and in response to an applied signal, during alternate half-cycles of the applied signal and for time intervals of less than 180° of the applied signal; and means for applying said switching signal to said switching device to control the switching operation therein and develop a pair of audio signals, corresponding to said audio signals A and B, in said output circuits.

12. A receiver for a stereo FM transmission system for utilizing a transmitted signal comprising a carrier frequency-modulated in accordance with a modulation function of the general form $$M(t)=K_1(A+B)+K_2(A-B)\cos\omega_s t+K_3S'$$

where A and B are audio signals, $K_2(A-B)\cos\omega_s t$ represents both sidebands of the fundamental component of a suppressed carrier amplitude modulated subcarrier signal having an angular frequency $\omega_s$ and a phase reversal with each zero crossing of the amplitude modulation, S′ is a pilot signal of a frequency related to said fundamental frequency component of said subcarrier signal, $K_1$—$K_3$ are constants denoting amplitude levels, and $K_1$ is substantially equal to $K_2$, comprising: a discriminator; input means for applying a received signal to said discriminator to develop a signal corresponding to said modulation function; a demodulator having an input circuit coupled to said discriminator and having two output circuits for deriving signals of the form $K_4A$ and $K_5B$, respectively, where $K_4$ and $K_5$ are constants; means responsive to the $K_3S'$ term of said modulation function for deriving a demodulating signal of constant phase so related to said function that its modulation with said function yields modulation products including terms $K_4A$ and $K_5B$; and means for concurrently applying said signal corresponding to said modulation function and said demodulating signal to said demodulator.

13. A receiver for a stereo FM transmission system for utilizing a transmitted signal comprising a carrier frequency-modulated in accordance with a modulation function of the general form $$M(t)=(A+B)+(A-B)\cos\omega_s t+KS'$$

where A and B are audio signals, $(A-B)\cos\omega_s t$ represents both sidebands of the fundamental component of a suppressed carrier amplitude modulated subcarrier signal having an angular frequency $\omega_s$ and a phase reversal with each zero crossing of the amplitude modulation, S′ is a pilot signal of a frequency related to said fundamental frequency component of said subcarrier signal, and K is a constant, comprising: a discriminator; input means for applying a received signal to said discriminator to develop a signal corresponding to said modulation function; a demodulator having an input circuit coupled to said discriminator and having two output circuits for deriving signals of the form $K_4A$ and $K_5B$, respectively, where $K_4$ and $K_5$ are constants; means responsive to the KS′ term of said modulation function for deriving a demodulating signal in accordance with the function $$\frac{1}{2}+\frac{2}{\pi}\cos\omega_s t-\frac{2}{3\pi}\cos 3\omega_s t$$

where $\omega_s t$ is the angular velocity of said subcarrier signal; means for modifying said signal corresponding to said modulation function to establish the ratio of the $(A+B)$ to the $(A-B)$ terms thereof to the value $2/\pi$; and means for concurrently applying said modified signal corresponding to said modulation function and said demodulating signal to said demodulator.

14. A stereo FM transmission system comprising: means for developing a first audio signal A and a second audio signal B; means for generating a subcarrier signal having a fundamental frequency S which is substantially higher than the highest audio frequency to be transmitted; means for effectively modulating said A and B audio signals and said subcarrier signal to develop a double-sideband suppressed-carrier amplitude-modulated subcarrier signal; transmission means for generating a transmission signal comprising a carrier frequency modulated in accordance with the modulation function $$M(t)=K_1(A+B)+K_2(A-B)\cos\omega_s t+K_3S'$$

where S′ is a pilot signal of a frequency related to said frequency S, $K_1$–$K_3$ are constants and $K_1$ is substantially equal to $K_2$; means for receiving said frequency-modulated carrier including a discriminator for deriving therefrom a composite modulation signal corresponding to said modulation function; a demodulator having an input circuit coupled to said discriminator and having two output circuits for deriving signals of the form $K_4A$ and $K_5B$, respectively, where $K_4$ and $K_5$ are constants; means responsive to the $K_3S'$ term of said composite modulation function for deriving a demodulating signal so related to said composite modulation function that its modulation therewith yields modulation products including terms $K_4A$ and $K_5B$; and means for concurrently applying said signal corresponding to said modulation function and said demodulating signal to said demodulator.

15. A transmitter for a stereo FM transmission system in accordance with claim 1 in which said frequency modulation means modulates said carrier signal with said pilot signal to a maximum of 10 percent of the total possible modulation.

16. A transmitter for a stereo FM transmission system in accordance with claim 1 in which the $K_1(A+B)$ term and the $K_2(A-B)\cos\omega_s t$ term of said modulating function M(*t*) are interleaved in a time domain and in which said modulating means effect the same maximum deviation of said carrier signal in response to said $K_1(A+B)$ and to said $K_2(A-B)\cos\omega_s t$ terms of said function.

17. A transmitter for a stereo FM transmission system in accordance with claim 16 in which said modulating means effect modulation of said carrier signal, expressed in percent of total possible modulation, a maximum of 10 percent in response to said pilot signal and a maximum of 90 percent in response to said $(A+B)$ and to said $(A-B)\cos\omega_s t$ terms of said modulating function.

18. A receiver for a stereo FM transmission system for utilizing a transmitted signal comprising a carrier frequency-modulated in accordance with a modulation function of the general form $$M(t)=K_1(A+B)+K_2(A-B)\cos\omega_s t+K_3S'$$

where A and B are audio signals, $K_2(A-B)\cos\omega_s t$ represents both sidebands of the fundamental component of a suppressed-carrier amplitude-modulated subcarrier signal having an angular frequency $\omega_s$, S′ is a pilot signal of a frequency related to said fundamental component of said subcarrier signal, $K_1$—$K_3$ are constants, and $K_1$ is substantially equal to $K_2$, comprising: a first signal translating channel including a discriminator, input means for applying the received signal to said discriminator to develop a signal corresponding to said modulation function, means for deriving from the output signal of said discriminator a program signal representing only the A audio signal, and amplifying and sound reproducing means for utilizing said A signal; and a second signal translating channel including said discriminator, said input means for applying the received signal to said discriminator to develop a signal corresponding to said modulation function, means for deriving from the output signal of said discriminator a program signal representing only the B audio signal, and amplifying and sound reproducing means for utilizing said B signal.

19. A receiver in accordance with claim 18 in which said input means includes an intermediate-frequency channel having a bandwidth which is at least approximately 2.1 times the deviation of said received frequency-modulated carrier signal.

20. A receiver in accordance with claim 19 in which the intermediate frequency bandwidth is approximately 230 kilocycles and the maximum deviation of said received frequency-modulated signal is 75 kilocycles.

21. A receiver in accordance with claim 20 in which the bandwidth of said discriminator is of the order of 300 kilocycles.

22. A receiver in accordance with claim 18 having a limiter included in that portion of said receiver comprised of said discriminator and said input means for applying said received signal to said discriminator.

23. A receiver in accordance with claim 9 in which said switching signal has approximately a square waveform.

24. A receiver for a stereo FM transmission system for utilizing a transmitted signal comprising a carrier frequency-modulated in accordance with a modulation function of the general form $$M(t)=K_1(A+B)+K_2(A-B)\cos\omega_s t$$

where A and B are audio signals, $K_2(A-B)\cos\omega_s t$ represents both sidebands of the fundamental component of a suppressed-carrier amplitude-modulated subcarrier signal having an angular frequency $\omega_s$ and a phase reversal with each zero crossing of the amplitude modulation, and $K_1$—$K_2$ are substantially equal constants, comprising: a discriminator; input means for applying a received signal to said discriminator to develop a signal corresponding to said modulation function; means coupled to said discriminator for generating a switching signal of constant phase and having a fundamental frequency equal to the frequency of said subcarrier; a switching device, having an input circuit coupled to said discriminator and having two output circuits, for applying a signal from said input circuit to said output circuits in alternation in response to an applied signal; and means for applying said switching signal to said switching device to control the switching operation therein and develop a pair of audio signals, corresponding to said audio signals A and B, in said output circuits.

25. A receiver for a stereo FM transmission system for utilizing a transmitted signal comprising a carrier frequency-modulated in accordance with a modulation function of the general form $$M(t)=K_1(A+B)+K_2(A-B)\cos\omega_s t$$

where A and B are audio signals, $K_2(A-B)\cos\omega_s t$ represents both sidebands of the fundamental component of a suppressed-carrier amplitude-modulated subcarrier signal having an angular frequency $\omega_s$ and a phase reversal with each zero crossing of the amplitude modulation, and $K_1$—$K_2$ are substantially equal constants, comprising: a first signal translating channel including a discriminator, input means for applying the received signal to said discriminator to develop a signal corresponding to said modulation function, means for supplying a demodulation signal of constant phase and having a frequency equal to the fundamental of said subcarrier, means for utilizing said demodulating signal to derive from the output signal of said discriminator a program signal representing the A audio signal, and amplifying and sound reproducing means for utilizing said A signal; and a second signal translating channel including said discriminator, said input means for applying the received signal to said discriminator to develop a signal corresponding to said modulation function, means for supplying a demodulation signal of constant phase and having a frequency equal to the fundamental of said subcarrier, means for utilizing said demodulating signal to derive from the output signal of said discriminator a program signal representing the B audio signal, and amplifying and sound reproducing means for utilizing said B signal.

References Cited by the Examiner

UNITED STATES PATENTS

| | | | |
|---|---|---|---|
| 2,262,764 | 11/1941 | Hull | 179—15 |
| 2,352,634 | 4/1944 | Hull | 179—15 |
| 2,654,885 | 10/1953 | Wilmotte | 179—15 |
| 2,669,712 | 2/1954 | Rial | 179—15 |
| 2,698,379 | 12/1954 | Boelens et al. | 179—15 |
| 2,779,020 | 1/1957 | Wilmotte | 179—15 |
| 2,851,617 | 9/1958 | Walker | 179—15 |
| 2,921,981 | 1/1960 | Kidd | 179—15 |
| 3,046,329 | 4/1962 | Reesor | 178—5.6 |
| 3,068,475 | 12/1962 | Avins | 179—15 |
| 3,069,505 | 12/1962 | Collins | 179—15 |
| 3,071,643 | 1/1963 | Matthews | 178—5.6 |
| 3,095,479 | 6/1963 | Le Blan | 179—15 |

FOREIGN PATENTS

| | | |
|---|---|---|
| 205,255 | 5/1955 | Australia. |

OTHER REFERENCES

"A System of Stereophonic Broadcasting," Electronic Engineering, April 1960, pp. 238–239.

DAVID G. REDINBAUGH, *Primary Examiner.*

ROBERT H. ROSE, *Examiner.*

W. HLUSKO, R. L. GRIFFIN, *Assistant Examiners.*